(12) United States Patent
Bartels

(10) Patent No.: US 8,591,154 B2
(45) Date of Patent: Nov. 26, 2013

(54) CART CARRIER WITH BIASED CLAMPING DEVICE

(75) Inventor: Alan William Bartels, Wilton, IA (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 13/554,290

(22) Filed: Jul. 20, 2012

(65) Prior Publication Data

US 2013/0189046 A1 Jul. 25, 2013

Related U.S. Application Data

(60) Provisional application No. 61/509,915, filed on Jul. 20, 2011.

(51) Int. Cl.
  *B62D 63/06* (2006.01)
(52) U.S. Cl.
  USPC .................................................. 410/4
(58) Field of Classification Search
  USPC .......... 410/4, 3, 36; 280/204, 33.991, 33.992, 280/33.993, 47.19, 47.24, 47.35, 651, 79.3
  See application file for complete search history.

(56) References Cited

U.S. PATENT DOCUMENTS

| | | | | |
|---|---|---|---|---|
| 2,604,210 A * | 7/1952 | Boone | ............................. | 211/28 |
| 2,950,126 A * | 8/1960 | Armentrout | .................... | 410/66 |
| 3,807,750 A * | 4/1974 | Brown | ............................ | 280/35 |
| 4,032,165 A * | 6/1977 | Russell | ........................ | 280/79.3 |
| 4,902,188 A | 2/1990 | Page | | |
| 4,991,725 A * | 2/1991 | Welsch et al. | ................ | 211/162 |
| 5,082,074 A | 1/1992 | Fischer | | |
| 5,322,306 A | 6/1994 | Coleman | | |
| 5,573,078 A | 11/1996 | Stringer et al. | | |
| 5,860,485 A | 1/1999 | Ebbenga | | |
| 6,149,370 A | 11/2000 | DiBartolomeo | | |
| 6,168,367 B1 | 1/2001 | Robinson | | |
| 6,260,863 B1 * | 7/2001 | Orozco et al. | ........... | 280/33.997 |
| 6,299,184 B1 * | 10/2001 | Krawczyk | ..................... | 280/79.2 |
| 6,435,803 B1 | 8/2002 | Robinson | | |
| 6,742,792 B1 * | 6/2004 | Hooper et al. | ............... | 280/79.3 |
| 6,793,223 B2 * | 9/2004 | Ondrasik et al. | ........... | 280/47.35 |
| 6,832,884 B2 | 12/2004 | Robinson | | |
| 7,025,548 B2 | 4/2006 | Krawczyk et al. | | |
| 7,143,912 B2 * | 12/2006 | Caneba | ......................... | 224/153 |
| 7,219,904 B1 * | 5/2007 | Boom et al. | ................. | 280/79.3 |
| 7,549,651 B2 | 6/2009 | Holtan et al. | | |
| 7,854,444 B2 * | 12/2010 | Zhuang | ......................... | 280/651 |
| 8,342,544 B1 * | 1/2013 | Blewett et al. | ............. | 280/79.11 |
| 2002/0043544 A1 * | 4/2002 | Caneba | ......................... | 224/584 |
| 2003/0017021 A1 * | 1/2003 | Krawczyk | ....................... | 410/66 |
| 2003/0231945 A1 * | 12/2003 | Weatherly | ..................... | 414/604 |
| 2004/0056439 A1 * | 3/2004 | Arceta et al. | ............... | 280/47.34 |
| 2004/0071520 A1 | 4/2004 | Krawczyk et al. | | |
| 2004/0188963 A1 * | 9/2004 | Gant | ......................... | 280/47.24 |
| 2008/0217503 A1 * | 9/2008 | Zhuang | ......................... | 248/558 |
| 2012/0104731 A1 * | 5/2012 | Goldszer | ...................... | 280/651 |
| 2012/0325593 A1 * | 12/2012 | Reep | .............................. | 188/19 |

* cited by examiner

Primary Examiner — Kiran B Patel
(74) Attorney, Agent, or Firm — Quarles & Brady LLP

(57) ABSTRACT

A biased clamping device for use with a cart carrier that includes a cart support and a clamping channel moveable between an open position and a clamped position is disclosed. The biased clamping device includes a biasing member associated with the clamping channel that biases the clamping channel to the clamped position. The biasing member includes a first end attached to the cart support and a second end attached to the clamping channel. The biasing member loads when the clamping channel is moved between the clamped position and the open position.

20 Claims, 6 Drawing Sheets

US 8,591,154 B2

CART CARRIER WITH BIASED CLAMPING DEVICE

CROSS REFERENCE TO RELATED APPLICATIONS

This application claims priority to U.S. Provisional Patent Application No. 61/509,915, filed Jul. 20, 2011, which is hereby incorporated by reference as if set forth in its entirety.

STATEMENT OF FEDERALLY SPONSORED RESEARCH OR DEVELOPMENT

Not applicable.

FIELD OF THE INVENTION

The present invention relates to an apparatus and a vehicle for carrying carts. More particularly, the invention relates to an apparatus and a vehicle for carrying carts that includes a biased clamping device that may be selectively moved between an open position and a clamped position.

BACKGROUND PRIOR ART

Carts are used for a variety of purposes in retail environments. For example, consumers use shopping carts to store and transport items they wish to purchase as the shoppers move around a retail facility. Consumers may also use the shopping cart to load their items into their vehicle and often leave the shopping cart near that location, rather than return it to its designated area.

Additionally, retail personnel use stocking carts to replenish items on the store shelves, display units, and the like. To restock these items, retail personnel may manually push or pull around a stocking cart from a shipping area, warehouse, or storage section of the facility to a retail area. Due to the weight of the carts and the items loaded on the carts, retail personnel may be limited to moving a single cart at a time to replenish the items. This practice is inefficient, requiring the retail personnel to travel from the storage location to the display location several times to complete their task of restocking.

Vehicles and apparatuses have been developed for collecting and transporting a number of carts, especially in the context of shopping carts. For example, U.S. Pat. No. 6,168,367 discloses a shopping cart collection vehicle and method that involves an extendable boom attached to a lift truck to engage a number of nested shopping carts. U.S. Pat. Nos. 4,902,188, 5,082,074, and 5,322,306 also disclose vehicles for conveying shopping carts, or trolleys. These designs, however, do not provide a quick, efficient, and reliable mechanism to retain the carts during transportation to a desired location. Also, because several of these designs rely on the carts to be nested to help retain the carts, these designs may not be helpful for transporting stocking carts that contain items or even empty carts that are not configured to be nested.

Therefore, it is an object of the invention to provide an apparatus and vehicle that overcomes these problems.

SUMMARY OF THE INVENTION

In one embodiment, the present invention provides for a biased clamping device for use with a cart carrier having a platform, a cart support extending vertically from the platform, a clamping channel supported by the cart support and being movable between an open position and a clamped position, and an actuation rod that extends through the platform and engages the clamping channel to move the clamping channel between the open position and the clamped position. The biased clamping device includes a biasing member that is associated with the clamping channel. The biasing member biases the clamping channel to the clamped position. A first end of the biasing member is attached to the cart support and a second end of the biasing member is attached to the clamping channel. The biasing member loads when the clamping channel is moved to said open position.

In another aspect, the invention provides for a biased clamping device for a cart carrier configured for carrying a plurality of carts on a platform. The cart carrier includes a cart support extending vertically from the platform, at least one actuation rod, and a clamping channel supported by the cart support. The clamping channel is movable between an open position and a clamped position and restrains each one of the plurality of carts. The biased clamping device includes a first biasing member coupled to the clamping channel. The first biasing member biases the clamping channel to the clamped position and is configured to provide a biased vertical restrain to each one of the plurality of carts when the cart carrier is in the clamped position.

In another aspect, the invention provides for a biased clamping device for use with a cart carrier that includes a platform for loading a plurality of carts and a cart support extending vertically from the platform. The cart carrier also includes a clamping channel that is supported by the cart support and that is movable between an open position and a clamped position, and an actuation rod extending through the platform that engages the clamping channel to move the clamping channel between the open position and the clamped position. The biased clamping device includes a first biasing member associated with the clamping channel that biases the clamping channel to the clamped position. The first biasing member is positioned on a first end of the clamping channel and loads when the clamping channel is moved to the open position. The biased clamping device also includes a second biasing member associated with the clamping channel that biases the clamping channel to the clamped position. The second biasing member is positioned on a second end of the clamping channel and loads when the clamping channel is moved to the open position. The first biasing member and the second biasing member provide a biased vertical restraint for each one of the plurality of carts.

These and other features, aspects, and advantages of the present invention will become better understood upon consideration of the following detailed description, drawings and appended claims.

DETAILED DESCRIPTION OF THE PREFERRED EMBODIMENT

Figure 1:
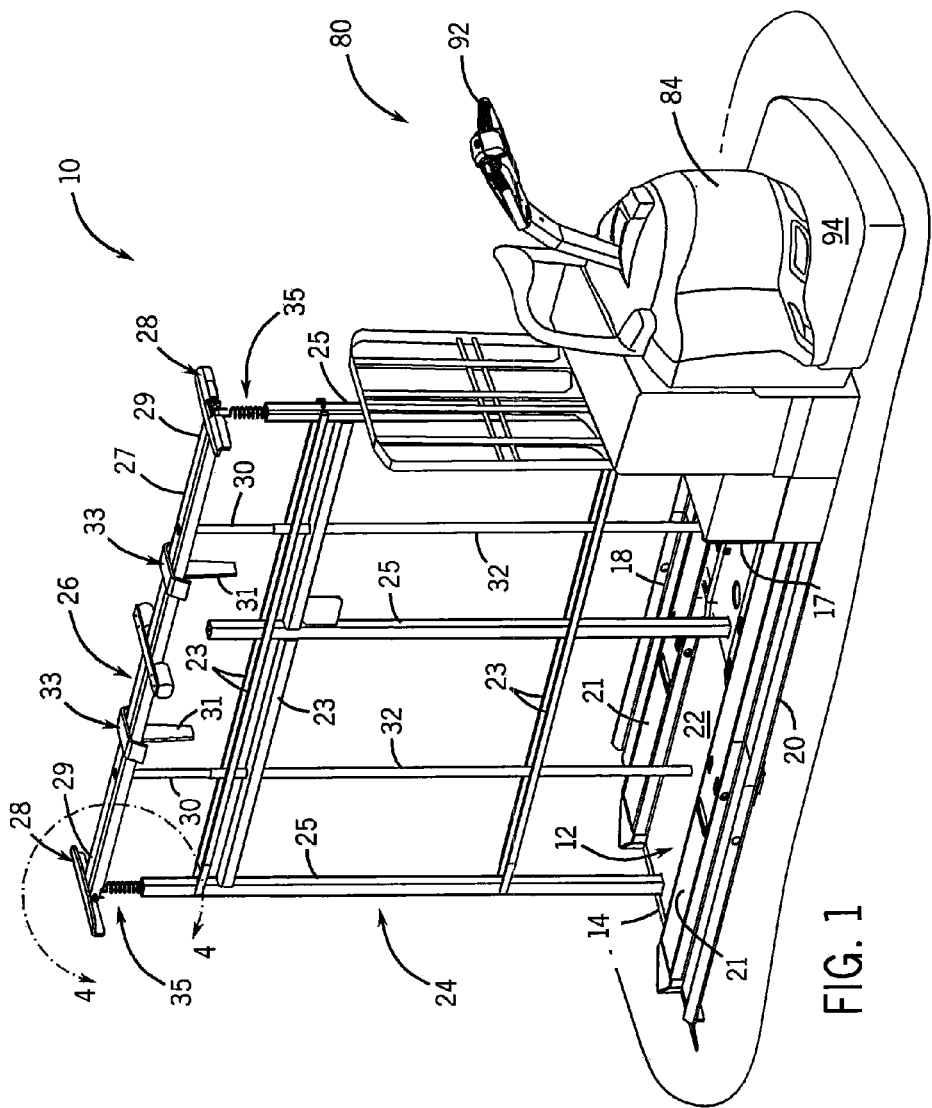
FIG. 1 is a perspective view of a cart carrier and vehicle incorporating the invention.
Figure 2:
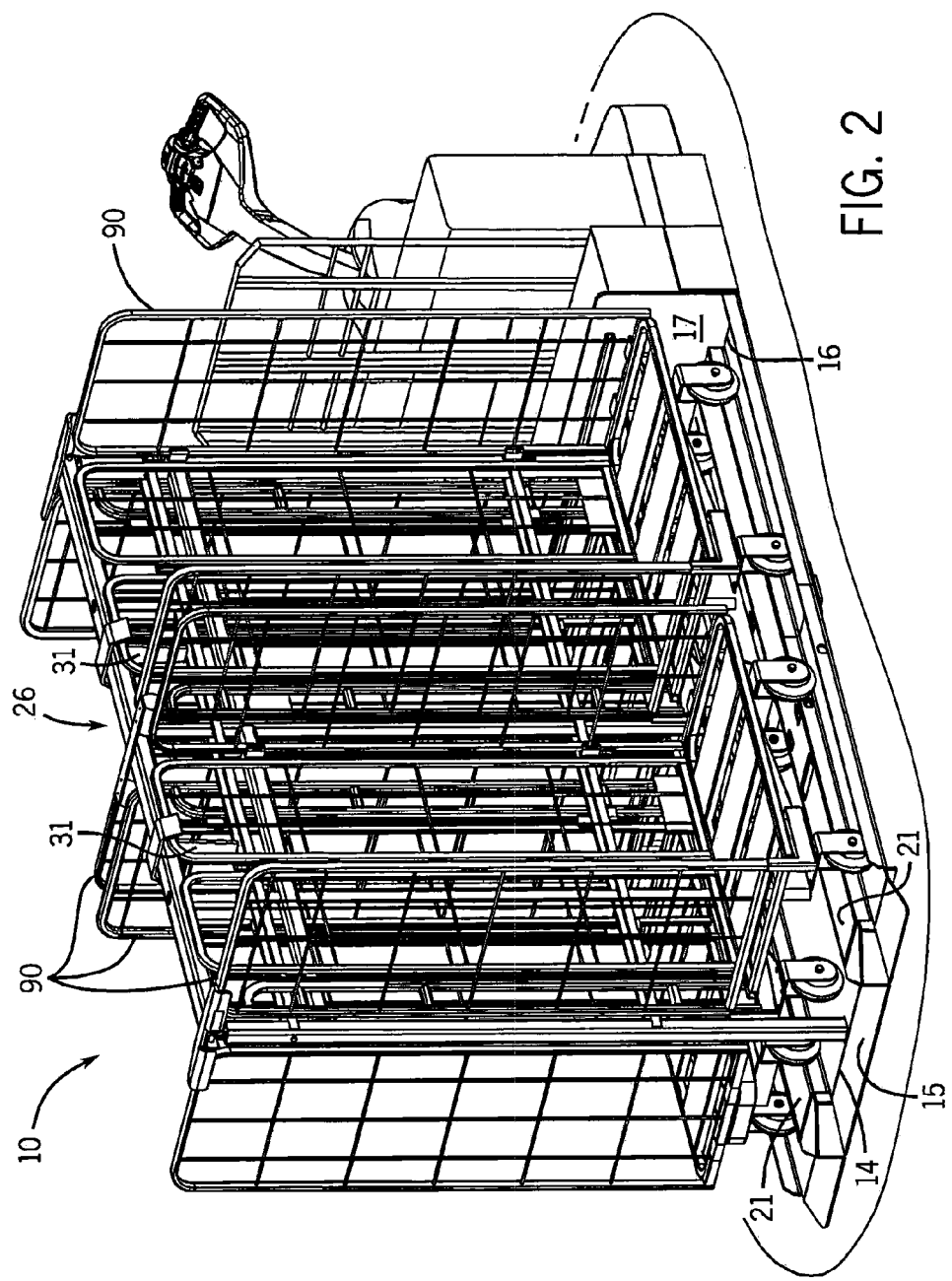
FIG. 2 is a perspective view of the cart carrier and vehicle of FIG. 1 including carts wherein the clamping channel is in the clamped position.

Referring to FIGS. 1 and 2, a cart carrier 10 incorporating the present invention and a vehicle 80 for transporting carts is illustrated. The cart carrier 10 includes a platform 12 having opposing ends 14, 16 joined by sides 18, 20 to form a cart support surface 22. The cart support surface 22 is slightly sloped toward the end 16 near the vehicle 80 and is also slightly sloped towards the center from each side 18, 20, but it is contemplated that the cart support surface 22 can also be horizontal with respect to the ground, or slightly sloped in other fashions. For example, the cart support surface 22 can be slightly sloped toward the end 14 away from the vehicle 80. A back wall 17 also forms part of the platform 12 and extends vertically from the cart support surface 22.

The cart carrier 10 also includes a cart support 24 that extends vertically from the platform 12. In the embodiment shown in FIG. 1, the cart support 24 extends from the platform 12 midway between the platform sides 18, 20, however, the cart support 24 can be off-center on the platform 12. The cart support 24 includes vertical support members 25 and horizontal support members 23.

A clamping channel 26 forms part of the cart carrier 10. The clamping channel 26 is supported by the cart support 24. The clamping channel 26 includes a longitudinal section 27 that is of a rectangular cross-section. Of course, the longitudinal section 27 can be of other cross-sectional profiles. The clamping channel 26 includes end holders 28 on the ends 29 of the longitudinal section 27. The clamping channel 26 further includes spacers 31 and clamping bars 33. As will be described in more detail below, the clamping channel 26 and its associated components vertically move between an open position and a clamped position, and are biased to the clamping position by a biased clamping device 35 located on each end 29 of the clamping channel 26.

In the embodiment shown in FIG. 1, the cart carrier 10 includes two actuation rods 30 that move the clamping channel 26 between the open position and the clamped position. However, the cart carrier 10 can be configured to include only one actuation rod 30, or to have two or more actuation rods 30. The actuation rods 30 extend through the platform 12 and engage the clamping channel 26. The actuation rods 30 also extend through portions of the cart support 24 and can also be configured to slide against the cart support 24. The cart support 24 provides stability for the actuation rods 30. Each actuation rod 30 fits inside a guide member 32 that provides support and further stability for the actuation rods 30. The guide member 32 can rest on or be attached to the platform 12. As will be discussed in further detail below, the actuation rods 30 vertically move the clamping channel 26 between an open position and a clamped position.

As shown in FIG. 2, the cart carrier 10 is configured to include two rows of carts 90 on the platform 12, with two carts 90 in each row. It is contemplated that the cart carrier 10 can be configured to transport one, two, or three or more rows of carts 90, with one or more carts 90 in each row. As illustrated in both FIGS. 1 and 2, the platform 12 can include a loading ramp 15 at an end 14 of the platform 12. The loading ramp 15 can extend across the width of the cart carrier 10 as a single component as shown, however, the loading ramp 15 can also be formed from two or more smaller components and extend across only a portion of the width of the cart carrier 10. The loading ramp 15 assists with loading and unloading the carts 90 from the cart carrier 10. As best shown in FIG. 1, the platform 12 includes fork channels 21. The fork channels 21 engage forks extending from the vehicle 80 and help stabilize the carts 90 during loading, unloading, and transporting the carts 90 on the cart carrier 10, as well as help stabilize the carts 90 and cart carrier 10 during lifting and lowering of the platform 12.

Figure 3:
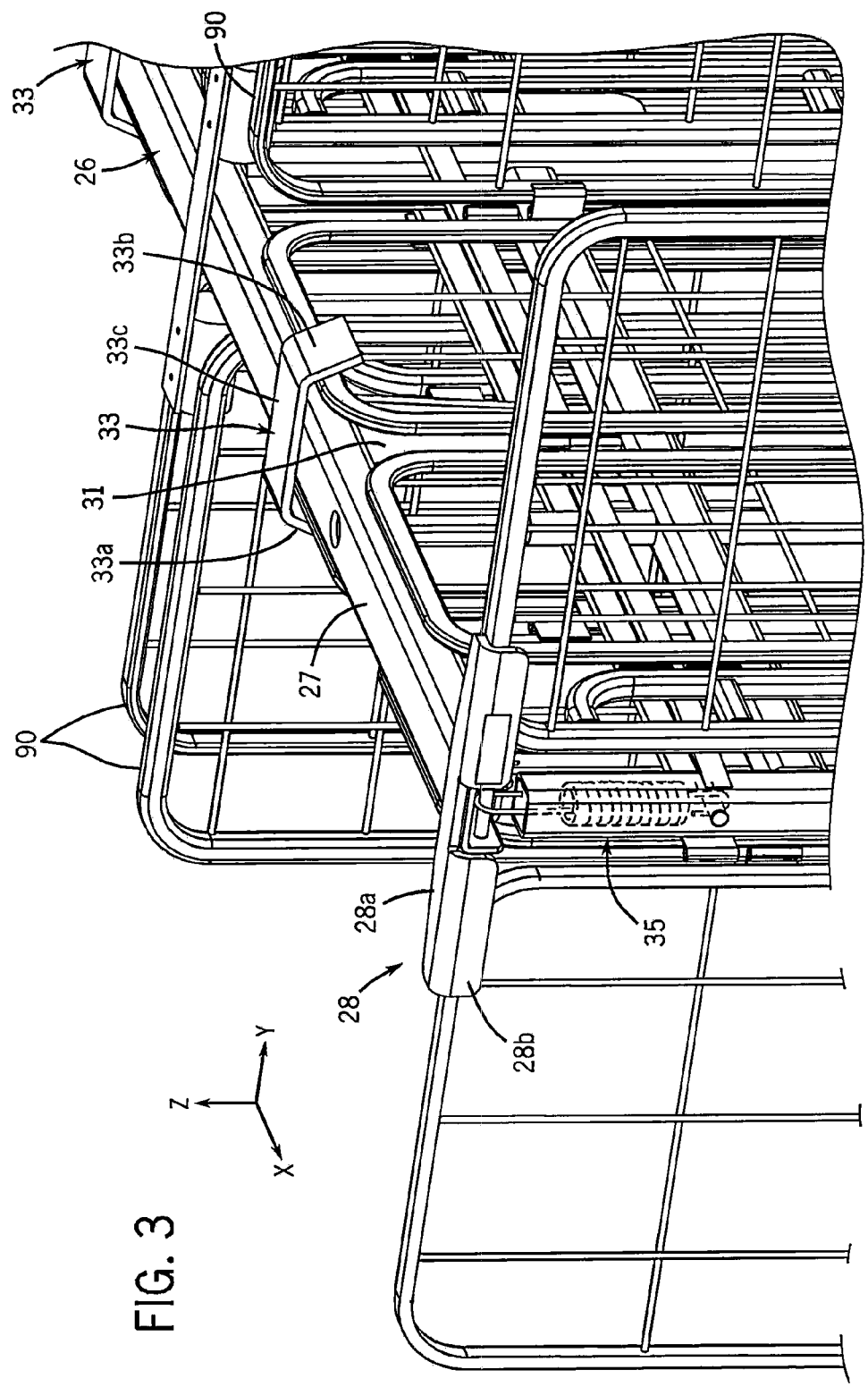
FIG. 3 is a detailed view of a portion of the cart carrier and vehicle from FIG. 2.

As illustrated in FIG. 3, the cart carrier 10 restrains carts 90 in all three directions (X, Y, and Z) when the clamping channel 26 is in the clamped position. The end holders 28, clamping bars 33, and spacers 31 all assist to restrain the carts 90.

The end holders 28 of the clamping channel 26 restrain the carts 90 in a longitudinal direction X and a vertical direction Z to the cart carrier 10. The end holders 28 include a horizontal section 28a that restrains the carts 90 in the vertical direction Z and include a vertical section 28b that restrains the carts 90 in a longitudinal direction X.

The clamping bars 33 of the clamping channel 26 restrain the carts 90 in a lateral direction Y and a vertical direction Z to the cart carrier 10. The clamping bars 33 include a horizontal section 33c and two angled sections 33a, 33b, with one angled section 33a, 33b being on each side of the horizontal section 33c. In the embodiment shown in FIGS. 1-6, the angled sections 33a, 33b are configured to be at an angle of about 30° with respect to the longitudinal section 27 of the clamping channel 26, however, it is contemplated that other angles can be used. While the cart carrier 10 shown in FIGS. 1-6 includes two clamping bars 33 on the clamping channel 26, the present invention is not restricted to a particular amount of clamping bars 33. It is to be understood by one of ordinary skill in the art that the amount and location of clamping bars 33 on the clamping channel 26 can be designed based on considerations including, but not limited to, the number of carts 90 to be carried on the cart carrier 10 and the construction of the particular carts 90.

Furthermore, the spacers 31 on the clamping channel 26 assist in restraining the carts 90 in the lateral direction Y. As best shown in FIG. 2, the spacers 31 are placed between the rows of carts 90. As referenced with respect to the clamping bars 33, one of ordinary skill in the art could configure the cart carrier 10 to vary the amount and location of the spacers 31 based on considerations including, but not limited, the number of carts 90 to be carried and the construction of the particular carts 90.

Thus, the carts 90 and their contents (not shown) can be restrained in all three directions X, Y, Z during transportation. The restraining capabilities of the cart carrier 10 ensures security of the contents of the cart 90, as well as the carts 90 themselves. In addition, the cart carrier 10 allows the carts 90 and their contents to be transported at greater speeds by a vehicle 80, especially when the vehicle 80 is turning, due to the restraining characteristics of the cart carrier 10.

Figure 4:
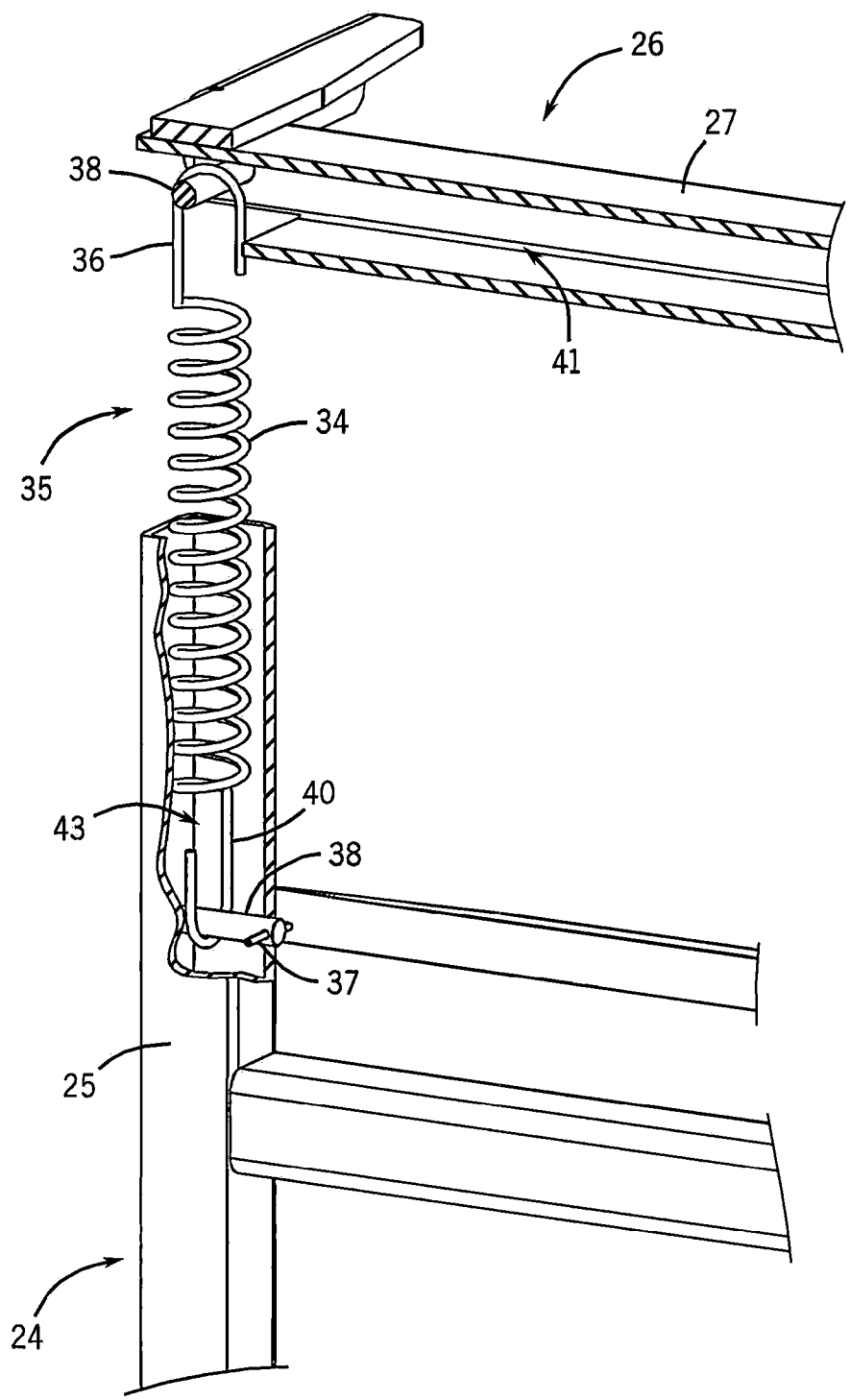
FIG. 4 is a detailed cut-away view along line 4-4 from FIG. 1.

Referring now to FIG. 4, the cart carrier 10 includes a biased clamping device 35. The biased clamping device 35 includes a biasing member 34 associated with the clamping channel 26 to bias the clamping channel 26 toward the clamped position. The biasing member 34 as shown in FIG. 4 is a coil spring, however, it is contemplated that other types of biasing members may be employed. The biasing member 34 is connected between the clamping channel 26 and the cart support 24. One end 36 of the biasing member 34 is connected to the clamping channel 26 via a clevis pin 38 located in an internal section 41 in the longitudinal section 27 of the clamping channel 26. Another end 40 of the biasing member 34 is connected to the vertical member 25 of the cart support 24 via another clevis pin 38 located in an internal section 43 of the vertical member 25. The clevis pins 38 are fixed with a cotter pin 37 (only one shown in FIG. 4). The biasing member 34 biases the clamping channel 26 towards the platform 12, as will be discussed in further detail below. The biasing member 34 is installed between the clamping channel 26 and the cart support 24 such that it is slightly loaded when the clamping channel 26 is in the clamped position to help bias the clamping channel 26 towards the platform 12 and provide enhanced restraining capabilities on the carts 90 in the X, Y, and Z directions. However, it is also contemplated that the biasing member 34 can be unloaded when the clamping channel 26 is in the clamped position.

Figure 5:
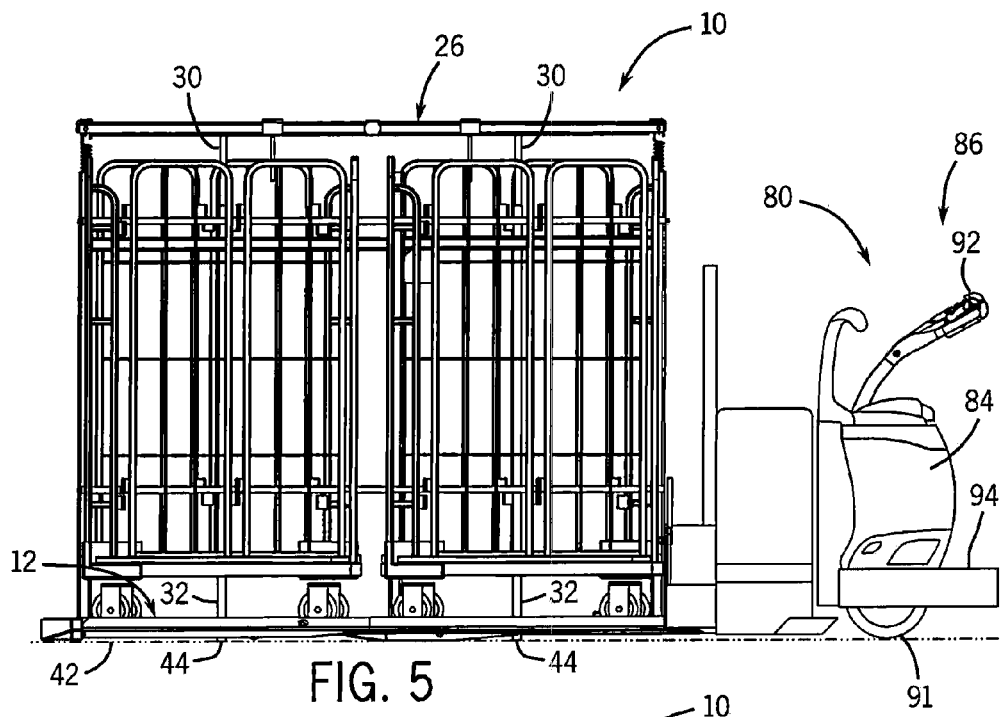
FIG. 5 is a side elevational view of the cart carrier and vehicle of FIG. 2 wherein the clamping channel is in the open position.
Figure 6:
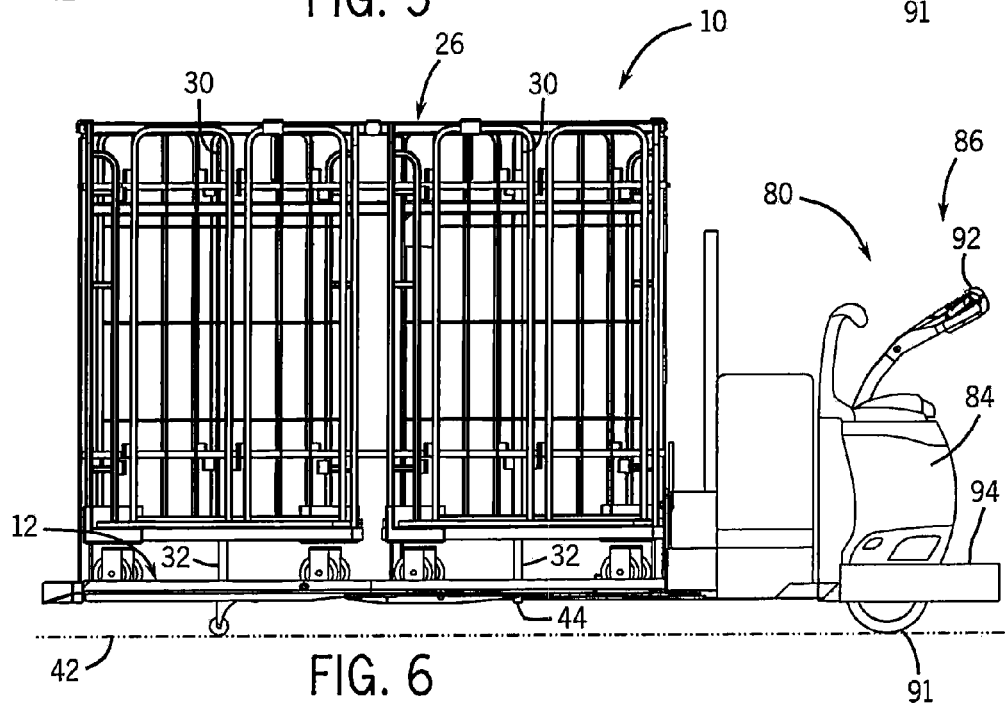
FIG. 6 is a side elevational view of the cart carrier and vehicle of FIG. 2 wherein the clamping channel is in the clamped position.

The process of how the cart carrier 10 vertically moves the clamping channel 26 between the open position, as shown in FIG. 5, and the clamped position, as shown in FIG. 6, and vice versa, will now be described. In the open position illustrated in FIG. 5, the clamping channel 26 provides clearance for carts 90 to be loaded or unloaded from the cart carrier 10. To provide this clearance, the platform 12 is lowered closer to the ground surface 42. The platform 12 is lowered by lowering the forks on the vehicle 80 that engage the fork channels 21. As shown in FIG. 5, a bottom end 44 of each of the actuation rods 30 engages the ground surface 42 when the platform 12 is lowered closer to the ground surface 42. When lowering the platform 12 of the cart carrier 10, the clamping channel 26 will initially also lower to the ground surface 42 because the clamping channel 26 is connected to the actuation rods 30. Once the bottom ends 44 of the actuation rods 30 engage the ground surface 42, however, the clamping channel 26 does not lower any further to the ground surface 42. Thus, as the platform 12 is continued to be lowered after the bottom ends 44 of the actuation rods 30 have contacted the ground surface 42, the clamping channel 26 vertically moves relative to the platform 12 creating a greater distance between the clamping channel 26 and the cart support surface 22 on the platform 12 to create clearance for carts 90 in the open position.

In moving to the open position, the biasing member 34 loads and biases the clamping channel 26 towards the cart support surface 22 of the platform. As previously discussed in detail with respect to FIG. 4, one end 36 of the biasing member 34 is connected to the clamping channel 26 and the other end 40 of the biasing member 34 is connected to the cart support 24. Because the cart support 24 (including the vertical support members 25) continues to be lowered with the platform 12 even after the bottom ends 44 of the actuation rods 30 contact the ground surface 42, the biasing member 34 becomes loaded by extension, biasing the clamping channel 26 towards the platform 12, and thus, the clamped position.

To begin moving the clamping channel 26 from the open position, as shown in FIG. 5, to the clamped position, as shown in FIG. 6, the platform 12 is raised. The platform 12 is raised by raising the forks on the vehicle 80 that engage the fork channels 21. As the platform 12 is raised, the distance between the cart support surface 22 and the clamping channel 26 is decreased. The cart support 24 is raised upwards with the platform 12 and moves relative to the actuation rods 30. Thus, the biasing member 34 contracts (or unloads) between the clamping channel 26 and the cart support 24 and becomes partially unloaded. Once the biasing member 34 has contracted, but the platform 12 is still being raised, the cart support 24 will lift the clamping channel 26 at the same rate that the platform 12 is being raised. Alternatively or additionally, carts 90 can contact the clamping channel 26 as the platform is raised to raise the clamping channel 26. By raising the clamping channel 26, the bottom ends 44 of the actuation rods 30 are raised off of the ground surface 42. This provides ample clearance between the actuation rods 30 and the ground surface 42 such that the cart carrier 10 can be transported in the clamped position. As shown in FIG. 6, when the clamping channel 26 of the cart carrier 10 is in the clamped position, the clamping channel 26 engages all the carts 90 to restrain the carts 90 as previously described.

As an alternative to having the bottom ends 44 of the actuation rods 30 contact the ground surface 42 to move the clamping channel 26 from the open position to the clamped position, the cart carrier 10 can employ other systems to selectively or automatically to move the clamping channel 26 from the open position to the clamped position. For example, a linkage system can be selectively employed by the operator or automatically employed when the platform 12 is lowered. The linkage system, rather than the ground surface 42, can contact the bottom ends 44 of the actuation rods 30 to vertically move the clamping channel 26 as described above.

Thus, the clamping channel 26 can vertically move in relation to the platform 12 between an open position and a clamped position. In the clamped position, the clamping channel 26 secures the carts 90 and the contents of the carts 90 as the carts 90 are transported from one location to another. This provides the advantage of allowing personnel to transport several carts 90 and their contents from one location to a desired location, and therefore, provides an efficient manner of transporting carts 90.

The biased clamping device 35 also helps to secure the carts 90 during transportation if the vehicle 80 transporting the carts 90 contacts any irregularities in the ground surface 42. For example, if the vehicle 80 contacts a raised portion in the ground surface 42 while transporting the carts 90, the carts 90 may be forced upwards. As the carts 90 move upwards, the carts 90 press against the end holders 28 and the clamping bars 33, forcing the clamping channel 26 upwards from platform 12. This upwards movement of carts 90 and clamping channel 26 can cause the biasing member 34 to expand between the cart support 24 and the clamping channel 26, which loads a biasing force on the clamping channel 26 to restrain the carts 90 toward the platform 12. In this manner, the biasing member 34 acts as a suspension mechanism for the carts 90 and helps protect against damage to the clamping channel 26 and its associated components by allowing the clamping channel 26 to move in relation to an upwards force applied by the carts 90. By this same mechanism, the biased clamping device 35 also protects the carts 90 and any contents carried on the carts 90.

An additional benefit of the biased clamping device 35 is that the enhanced restraining and suspension properties of the biased clamping device 35 described above are transferred to all carts 90 being transported by the cart carrier 10. This benefit is achieved in the illustrated embodiment of the cart carrier by having a biased clamping device 35 on each end 29 of the clamping channel 26 and the clamping channel 26 extending substantially from one end 14 of the platform 12 to substantially the other end 16 of the platform 12.

The cart carrier 10 also provides several other advantages. The cart carrier does not require that the carts 90 be nested when transported, which allows the carts 90 to be used in restocking applications. In addition, the configuration of the clamping channel 26 and its associated components (e.g., end holders 28, spacers 31, and clamping bars 33) for restraining the carts 90 provides retail personnel with unhindered access to items on the carts 90 when the carts 90 are used in restocking applications. This allows retail personnel to restock items with more efficiency and ease.

The clamping and opening mechanisms of the cart carrier 10 also provides the benefit of automatically occurring due to movement of the platform 12. Thus, the cart carrier 10 saves an operator time after loading the carts 90 onto the platform 12 by not having to perform multiple steps to ensure the carts 90 will be restrained on the carrier 10 during transportation and by not having to perform multiple steps to unlock the carts 90 after transporting them to unload them at the desired location.

As best illustrated in FIGS. 1, 5, and 6, the vehicle 80 is configured to removably attach to the cart carrier 10. The vehicle can include forks (within the fork channels 21 in FIGS. 1 and 2), a body 84 that includes a frame (not shown), and a control system 86 that includes a motor (not shown), wheels 91, and a steering system 92. As discussed above, the forks of the vehicle 80 can be configured to engage the platform 12 of the cart carrier 10 to vertically move the clamping channel 26 between the open position and the clamped position. The vehicle 80 can also include an operator compartment 94 providing an operator with a position to ride on the vehicle 80 while transporting the carts 90. The vehicle 80 can be a Raymond Model 8400 End Rider Pallet Truck manufactured by The Raymond Corporation, Greene, N.Y. 13778, however, it is contemplated that other vehicles can be used for removably attaching to the cart carrier 10 for transporting carts 90.

Figure 7:
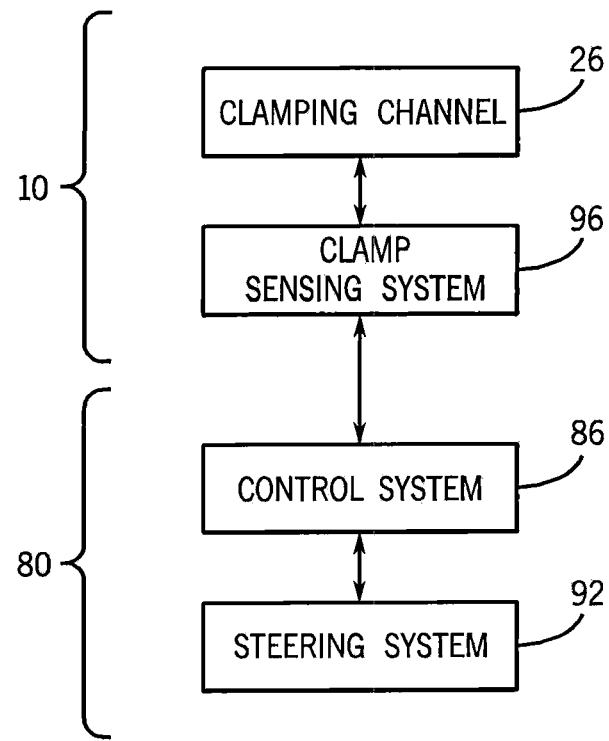
FIG. 7 is a flowchart showing the electrical connection of selected components of the cart carrier of FIG. 1 to the vehicle.

As illustrated in FIG. 7, the cart carrier 10 also includes a clamp sensing system 96. FIG. 7 displays the electrical connection of selected components of the cart carrier 10 to the vehicle 80. As illustrated in FIG. 7, the clamp sensing system 96 is connected to the control system 86 of the vehicle 80, either by hardwire or a remote connection. The clamp sensing system 96 senses whether the clamping channel 26 is in the clamped position. A proximity sensor or a limit switch can form part of the clamping sensing system 96 to sense whether the clamping channel 26 is in the clamped position. If the clamp sensing system 96 senses that the clamping channel 26 is not in the clamped position, then the clamp sensing system 96 issues a warning to the operator of the vehicle 80. Alternatively or additionally, the clamp sensing system 96 can prevent the control system 86 from activating until the clamp sensing system 96 senses that the clamping channel 26 is in the clamped position. The clamping sensing system 96 can employ sensors including, but not limited to, pressure sensors and proximity sensors, to assist in determining whether the clamping channel 26 is in the clamped position.

It should be understood that the apparatuses and processes described above are only exemplary and do not limit the scope of the invention, and that various modifications could be made by those skilled in the art that would fall under the scope of the invention. For example, the amount of actuation rods 30 in the cart carrier 10, the shape and amount of clamping bars 33 and spacers 31 on the clamping channel 26, and sizes of the platform 12, as well as other features of the cart carrier 10 can be changed based on the amount and construction of the carts 90 that are to be transported. Additionally, the number and arrangement of biased clamping devices 35 used in the cart carrier 10 could be modified.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another, but are used merely as labels to distinguish one claim element having a certain name from another element having a same name (but for use of the ordinal term) to distinguish the claim elements.

Thus, the invention is to cover all modifications, equivalents, and alternatives falling within the spirit and scope of the invention as defined by the following appended claims. To apprise the public of the scope of this invention, the following claims are made.

What is claimed is:

1. A biased clamping device for use with a cart carrier that includes a platform, a cart support extending vertically from the platform, a clamping channel that is supported by the cart support and that is movable between an open position and a clamped position, and an actuation rod extending through the platform that engages the clamping channel to move the clamping channel between the open position and the clamped position, the biased clamping device comprising:
a first biasing member associated with said clamping channel that biases said clamping channel to the clamped position, said first biasing member including a first end attached to said cart support and a second end attached to said clamping channel, said first biasing member loading when said clamping channel is moved to said open position.

2. The biased clamping device of claim 1, wherein said first biasing member biases said clamping channel to the clamped position by biasing said clamping channel towards said platform.

3. The biased clamping device of claim 1, wherein said first biasing member is a coil spring.

4. The biased clamping device of claim 1, wherein said first end of said first biasing member is attached to said cart support by engagement with a first clevis pin and said second end of said first biasing member is attached to said clamping channel with a second clevis pin.

5. The biased clamping device of claim 4, wherein the first clevis pin is located in an internal section of the cart support.

6. The biased clamping device of claim 4, wherein the second clevis pin is located in an internal section of the clamping channel.

7. The biased clamping device of claim 1, wherein the first biasing member loads when the platform is lowered.

8. The biased clamping device of claim 1, wherein the first biasing member is partially loaded when the clamping channel is in the clamped position.

9. The biased clamping device of claim 1, wherein the cart carrier is configured to carry a plurality of carts, the clamping channel is configured to engage each one of the plurality of carts in the clamped position, and the first biasing member is configured to provide a biased vertical restraint to each one of the plurality of carts when the clamping channel is in the clamped position.

10. The biased clamping device of claim 1, the biased clamping device further comprising:
a second biasing member associated with said clamping channel that biases said clamping channel to the clamped position, said second biasing member including a first end attached to said cart support and a second end attached to said clamping channel, said second biasing member loading when said clamping channel is moved to said open position.

11. The biased clamping device of claim 10, wherein the first biasing member is positioned on a first end of the clamping channel and the second biasing member is positioned on a second end of the clamping channel, the first end of the clamping channel being opposite from the second end of the clamping channel.

12. A biased clamping device for a cart carrier configured for carrying a plurality of carts on a platform, the cart carrier including a cart support extending vertically from the platform, at least one actuation rod, and a clamping channel supported by the cart support and being movable between an open position and a clamped position, the clamping channel restraining each one of the plurality of carts, the biased clamping device comprising:
   a first biasing member coupled to the clamping channel, the first biasing member biasing the clamping channel to the clamped position and is configured to provide a biased vertical restraint to each one of the plurality of carts when the cart carrier is in the clamped position.

13. The biased clamping device of claim 12, wherein the first biasing member is a coil spring.

14. The biased clamping device of claim 12, wherein the first biasing member includes a first end and a second end, the second end being opposite the first end, wherein the first end of the first biasing member is coupled to the cart support and the second end of the first biasing member is coupled to the clamping channel.

15. The biased clamping device of claim 14, wherein said first end of said first biasing member is attached to said cart support by engagement with a first clevis pin and said second end of said first biasing member is attached to said clamping channel with a second clevis pin.

16. The biased clamping device of claim 12, wherein the first biasing member loads when the platform is lowered.

17. The biased clamping device of claim 12, wherein the first biasing member is partially loaded when the cart carrier is in the clamped position.

18. The biased clamping device of claim 12, wherein said first biasing member biases said clamping channel to the clamped position by biasing said clamping channel towards said platform.

19. The biased clamping device of claim 12, further comprising:
   a second biasing member associated with said clamping channel that biases said clamping channel to the clamped position, said second biasing member including a first end attached to said cart support and a second end attached to said clamping channel, said second biasing member loading when said clamping channel is moved to said open position.

20. A biased clamping device for use with a cart carrier that includes a platform for loading a plurality of carts, a cart support extending vertically from the platform, a clamping channel that is supported by the cart support and that is movable between an open position and a clamped position, and an actuation rod extending through the platform that engages the clamping channel to move the clamping channel between the open position and the clamped position, the biased clamping device comprising:
   a first biasing member associated with said clamping channel that biases said clamping channel to the clamped position, the first biasing member being positioned on a first end of the clamping channel and loading when said clamping channel is moved to said open position; and
   a second biasing member associated with said clamping channel that biases said clamping channel to the clamped position, the second biasing member being positioned on a second end of the clamping channel and loading when said clamping channel is moved to said open position;
   the first biasing member and the second biasing member providing a biased vertical restraint for each one of the plurality of carts.

* * * * *